US011169520B2

(12) United States Patent
Hafner et al.

(10) Patent No.: US 11,169,520 B2
(45) Date of Patent: Nov. 9, 2021

(54) ENHANCED VEHICLE OPERATION

(71) Applicant: Ford Global Technologies, LLC, Dearborn, MI (US)

(72) Inventors: Michael Hafner, Ann Arbor, MI (US); Nitendra Nath, Troy, MI (US); Aaron L. Mills, Ann Arbor, MI (US); Jonathan Mcneely, Sterling Heights, MI (US); Andrew Brown, Canton, MI (US); Andreas Giersiefer, Leverkusen (DE); Zhao Wang, Novi, MI (US); Bahgat Aboushaban, Dearborn, MI (US); Shadi Jammoul, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 245 days.

(21) Appl. No.: 16/295,651

(22) Filed: Mar. 7, 2019

(65) Prior Publication Data

US 2020/0285233 A1 Sep. 10, 2020

(51) Int. Cl.
*G05D 1/00* (2006.01)
*B60Q 9/00* (2006.01)
*G05D 1/02* (2020.01)

(52) U.S. Cl.
CPC .............. *G05D 1/0061* (2013.01); *B60Q 9/00* (2013.01); *G05D 1/0212* (2013.01); *G05D 2201/0213* (2013.01)

(58) Field of Classification Search
CPC ............... G05D 1/0061; G05D 1/0212; G05D 2201/0213; B60Q 9/00; B60W 50/0205; B60W 2050/143; B60W 2710/202; B60W 2552/30; B60W 2552/53; B60W 2050/0095; B60W 2540/229; B60W 2040/0818; B60W 60/0053; B60W 30/12; B60W 60/0055; B60W 30/00; B62D 5/00; B62D 6/00; B62D 15/00
See application file for complete search history.

(56) References Cited

U.S. PATENT DOCUMENTS 7,479,892 B2  1/2009 Ling et al.
9,751,534 B2  9/2017 Fung et al.
(Continued)

FOREIGN PATENT DOCUMENTS

EP         1726513 B2    9/2017
WO    2016062936 A1    4/2016

OTHER PUBLICATIONS

Search Report dated Jul. 31, 2020 from the UK Intellectual Property Office regarding Application No. GB2002568.0 (2 pages).

*Primary Examiner* — Rodney A Butler
(74) *Attorney, Agent, or Firm* — Frank A. MacKenzie; Bejin Bieneman PLC

(57) ABSTRACT

A computer in a vehicle includes first and second electronic control units (ECUs). The first and second ECUs are programmed to monitor, respectively, a first operating condition and a second operating condition. Each operating condition includes one of path deviation, lane width, user awareness, or steering torque. The second ECU is programmed to monitor the second operating condition according to a protocol with a security measure. The first or second ECU is further programmed to control vehicle operation based on the first or second operating condition.

20 Claims, 7 Drawing Sheets

(56) References Cited

U.S. PATENT DOCUMENTS

| | | |
|---|---|---|
| 10,049,551 B2 | 8/2018 | Lindberg et al. |
| 2015/0142386 A1 | 5/2015 | Vaucher et al. |
| 2018/0346019 A1 | 12/2018 | Fujii |
| 2019/0013930 A1 | 1/2019 | Munir et al. |
| 2019/0122559 A1* | 4/2019 | Zhang ................... B60W 30/09 |
| 2019/0382016 A1* | 12/2019 | Chow ................... B60W 10/16 |

* cited by examiner

ENHANCED VEHICLE OPERATION

BACKGROUND

A vehicle can include sensors to collect data of an environment surrounding the vehicle. A computer in the vehicle can use the data to operate the vehicle. For example, the computer can operate the vehicle to follow a path. In another example, the computer can detect a user in the vehicle. Operation of the vehicle can depend on acquiring and transmitting accurate and timely data while the vehicle is operated on a roadway.

DETAILED DESCRIPTION

Figure 1:
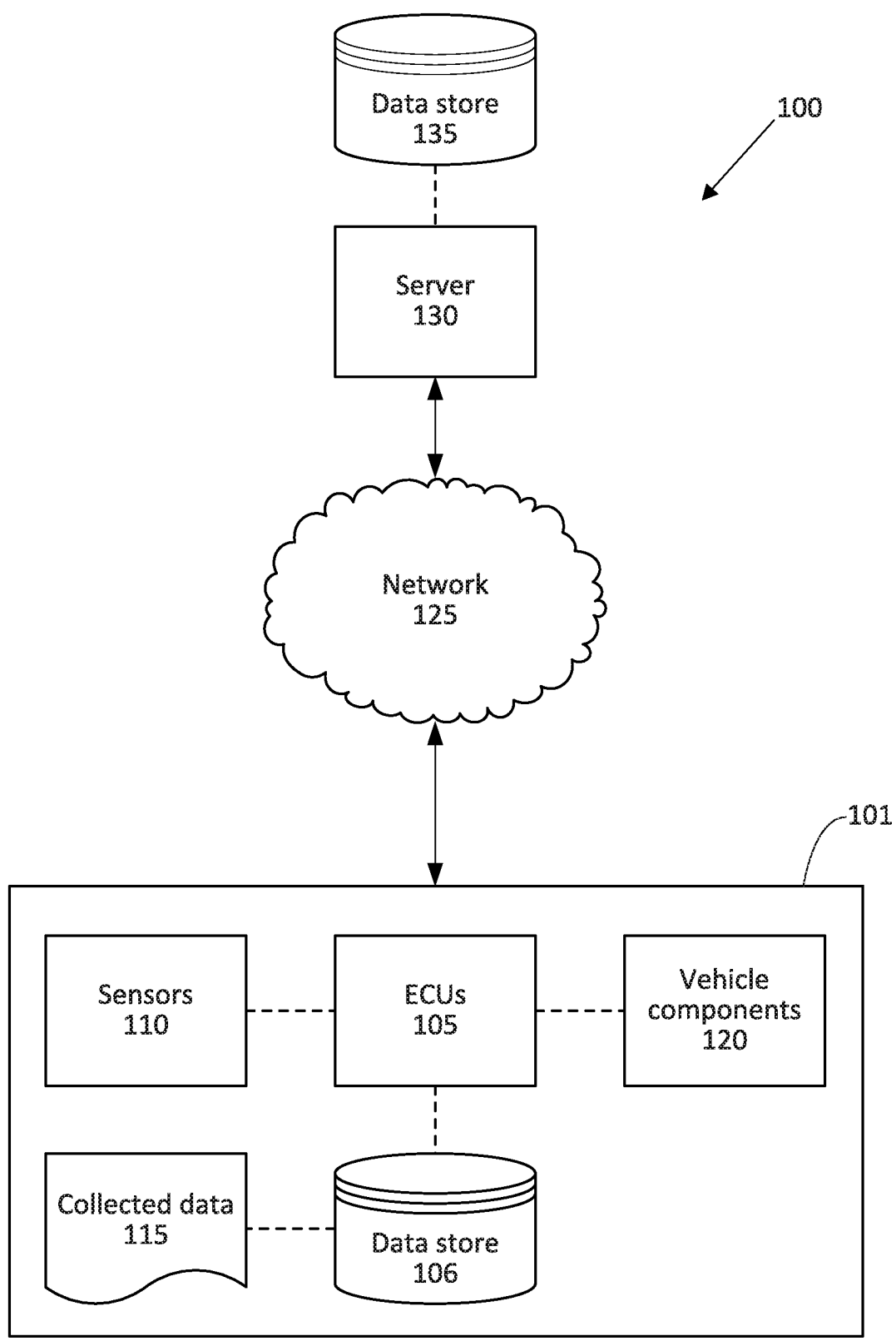
FIG. 1 is a block diagram of an example system for operating a vehicle.

A system includes first and second electronic control units (ECUs) in a vehicle programmed to monitor, respectively, a first operating condition and a second operating condition, each operating condition including one of path deviation, lane width, user awareness, or steering torque. The second ECU is programmed to monitor the second operating condition according to a protocol with a security measure. The first or second ECU is further programmed to control vehicle operation based on the first or second operating condition.

The vehicle operation can be one of controlling vehicle steering, transitioning from an autonomous mode to one of a semi-autonomous or a manual mode, or controlling a vehicle human machine interface.

The first ECU can be programmed to monitor the first operating condition according to a protocol with a security measure.

Programming to monitor path deviation can further include programming to determine that a deviation between a first projected path of the vehicle and a second projected path of the vehicle exceeds a deviation threshold, and then suppressing a driver assist feature in one or both of the first ECU or the second ECU.

Programming to monitor path deviation can include programming to, upon disabling the driver assist feature in one of the first ECU or the second ECU, control vehicle steering with the other of the first ECU or the second ECU.

Programming to monitor path deviation can include programming to determine a predicted steerable path based on at least one of a vehicle heading angle, a curvature, or a curvature rate.

Programming to monitor path deviation can include programming to determine a predicted lane path based on at least one of a lane marking, a lane barrier, and a roadway edge.

Programming to monitor lane width can include programming to determine that a lane width in front of the vehicle is below a width threshold for an elapsed time exceeding a time threshold, and then to suppress a driver assist feature in one of the first ECU or the second ECU.

Programming to monitor user awareness can include programming to, upon the first ECU determining that a user awareness is below an awareness threshold, actuate a driver alert with the second ECU.

Programming to monitor user awareness can include programming of the first ECU to determine that the user awareness is below the awareness threshold based on a user awareness assessment determined by a third ECU.

Programming to monitor steering torque with the first ECU can include programming to actuate a steering component to a specified steering torque based on a predicted steerable path from the second ECU.

Programming to monitor steering torque can include programming to, based on a predicted steerable path, identify a steering fault.

Programming to monitor steering torque can include programming to actuate a driver alert upon identifying the steering fault.

The first ECU can be further programmed to communicate with the second ECU according to a first protocol with a first security measure and to communicate with a third ECU according to a second protocol with a second security measure.

A method includes monitoring a first operating condition with a first ECU and a second operating condition with a second ECU, each operating condition including one of path deviation, lane width, user awareness, or steering torque. The method further includes monitoring the second operating condition according to a protocol with a security measure. The method further includes controlling vehicle operation based on the first or second operating condition.

The vehicle operation can be one of controlling vehicle steering, transitioning from an autonomous mode to one of a semi-autonomous or a manual mode, or controlling a vehicle human machine interface.

The method can further include monitoring the first operating condition according to a protocol with a security measure.

The method can further include determining that a deviation between a first projected path of the vehicle and a second projected path of the vehicle exceeds a deviation threshold, and then suppressing a driver assist feature in one or both of the first ECU or the second ECU.

The method can further include, upon disabling the driver assist feature in one of the first ECU or the second ECU, controlling vehicle steering with the other of the first ECU or the second ECU.

The method can further include determining a predicted steerable path based on at least one of a vehicle heading angle, a curvature, or a curvature rate.

The method can further include determining a predicted lane path based on at least one of a lane marking, a lane barrier, and a roadway edge.

The method can further include determining that a lane width in front of the vehicle is below a width threshold for an elapsed time exceeding a time threshold, and then suppressing a driver assist feature in one of the first ECU or the second ECU.

The method can further include, upon the first ECU determining that a user awareness is below an awareness threshold, actuating a driver alert with the second ECU.

The method can include determining that the user awareness is below the awareness threshold based on a user awareness assessment determined by a third ECU.

The method can further include actuating a steering component to a specified steering torque based on a predicted steerable path from the second ECU.

The method can further include identifying a steering fault based on a predicted steerable path.

The method can further include actuating a driver alert upon identifying the steering fault.

A system includes means for monitoring a first operating condition of a vehicle, means for monitoring a second operating condition of the vehicle according to a protocol with a security measure, and means for controlling vehicle operation based on the first operating condition or the second operating condition. Each operating condition includes one of path deviation, lane width, user awareness, or steering torque.

The system can further include means for monitoring path deviation including means for determining that a deviation between a first projected path of the vehicle and a second projected path of the vehicle exceeds a deviation threshold and means for suppressing a driver assist feature.

The system can further include means for monitoring lane width including means for determining that a lane width in front of the vehicle is below a width threshold for an elapsed time exceeding a time threshold and means for suppressing a driver assist feature.

The system can further include means for monitoring user awareness including means for, upon determining that a user awareness is below an awareness threshold, actuating a driver alert.

The system can further include means for monitoring the first operating condition according to a first protocol with a first security measure and means for monitoring the second operating condition according to a second protocol with a second security measure.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

A plurality of electronic control units (ECUs) can determine vehicle operating conditions, such as path deviation, lane width, user awareness, or steering torque. The ECUs can then actuate components in the vehicle based on the operating conditions. Data related to the operating conditions can be communicated over one of a plurality of communications protocols. Providing different communications protocols among a plurality of ECUs improve quality and reliability of data transmission between the ECUs and improves actuation of vehicle components. A first protocol can include a security measure that improves the reliability of the data, i.e., ensures that the data sent by the sensors is substantially the same as the data received by the ECUs. An ECU can receive multiple sets of data according to different protocols to ensure or enhance quality or reliability of the data.

Upon determining that the data are not accurate with respect to describing a specific operating condition, the ECUs can transition control of the vehicle to a user, i.e., the ECUs can transition the vehicle from an autonomous mode to one of a semi-autonomous or a manual mode. Because the plurality of protocols allow redundant quality analysis of the data, the ECUs can more accurately determine whether control of the vehicle should be returned to the user, proving more efficient and/or safer operation of the vehicle.

FIG. 1 illustrates an example system 100 for operating a vehicle 101. The vehicle 101 includes one or more electronic control units (ECUs) 105. As used herein, an "electronic control unit" is a device including a processor and a memory that includes programming to control one or more components 120.

The ECUs 105 are generally programmed for communications on a vehicle 101 network, e.g., including a conventional vehicle 101 communications bus. Via the network, bus, and/or other wired or wireless mechanisms (e.g., a wired or wireless local area network in the vehicle 101), the ECUs 105 may transmit messages to various devices in a vehicle 101 and/or receive messages from the various devices, e.g., controllers, actuators, sensors, etc., including sensors 110. Alternatively or additionally, in cases where the ECUs 105 actually comprise multiple devices and/or the vehicle 101 includes a plurality of ECUs, the vehicle network may be used for communications between devices represented as the ECUs 105 in this disclosure. In addition, the ECUs 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the ECUs 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, or the like.

The system 100 can further include a network 125 connecting a server 130 and a data store 135 to other devices such as a ECUs 105 in a vehicle 101. The ECUs 105 can further be programmed to communicate with one or more remote sites such as the server 130, via the network 125, such remote site possibly including a data store 135. The network 125 represents one or more mechanisms by which ECUs 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

When the ECUs 105 partially or fully operate the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the ECUs 105. A semi-autonomous mode is one in which at least one of vehicle 101 propulsion (typically via a powertrain including an electric motor and/or internal combustion engine), braking, and steering are controlled at least partly by the ECUs 105 as opposed to a human operator. In a non-autonomous mode, i.e., a manual mode, the vehicle 101 propulsion, braking, and steering are controlled by the human operator.

Figure 2:
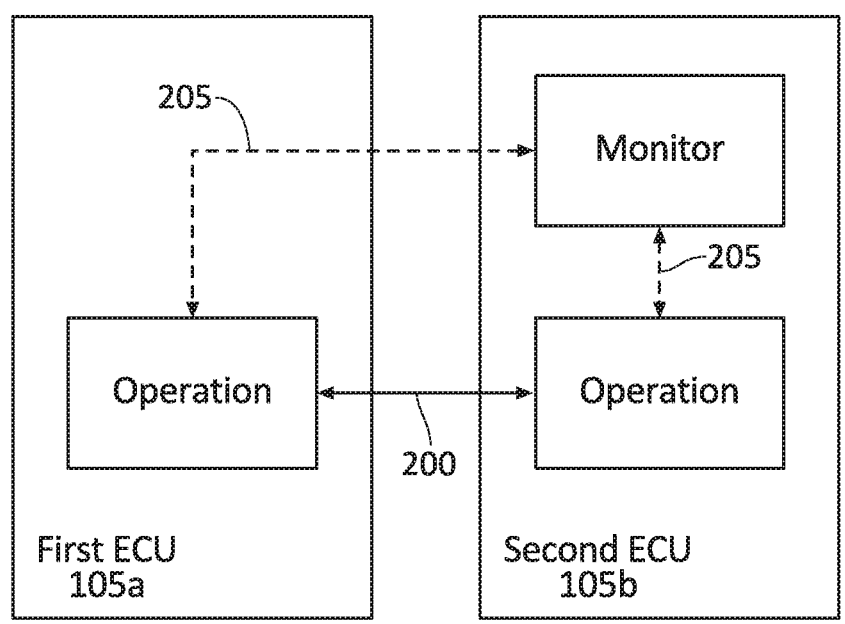
FIG. 2 is a block diagram of example electronic control units (ECUs) in the vehicle.

FIG. 2 is a diagram of two example ECUs 105a, 105b, collectively, ECUs 105. The ECUs 105 can each operate one or more vehicle components 120. For example, the ECU 105a can be an ADAS ECU, as described below, and can actuate a propulsion. In another example, the ECU 105b can be a steering ECU, as described below, and can actuate a steering component.

The ECUs 105 can communicate with each other. The ECUs 105 typically can communicate according to one of three protocols 200, 205, 210, as described below. Each protocol can include a "security measure," i.e., encryption and/or other robustness measures that ensure quality of data 115 transmitted according to the protocol. As used here, a "security measure" is encryption and/or other robustness measures that ensure quality of data 115 transmitted according to the protocol. That is, during transmission of the data 115 from the sensors 110 to the ECUs 105, electronic interference can alter some of the data 115, rendering the altered data 115 inaccurate for use by the ECUs 105. The "robustness" of the data 115 is the quality of the data 115, i.e., the amount, e.g., percentage, of data 115 collected by the sensors 110 that remains unchanged upon transmission between the ECUs 105. A "robustness measure" is programming that maintains quality of data 115 transmitted from the sensor 110 to the ECUs 105. For example, in addition or as an alternative to encryption, the security measure can include end-to-end protection, i.e., specified data collection and filtering algorithms that ensure that data 115 transmitted to the ECUs 105 are not lost, altered, or otherwise inaccurate from the data 115 collected by the sensors 110. Thus, the robustness, i.e., the quality, of the data 115 can be improved with the security measure. In another example, the security measure can include redundant data collection algorithms that each process the same data 115. If the redundant algorithms produce the same result, the ECUs 105 can determine that the received data 115 are robust. If the redundant algorithms produce different results, the ECUs 105 can arbitrate between the results and determine that one or more of the redundant algorithms does not produce robust data 115.

In another example, the security measure can be a checksum, i.e., an algorithm that receives a specific string of data 115, converts the string to a number, and compares the number to a predetermined value, the predetermined value determined based on converting the string with the checksum prior to transmission. Thus, if data 115 are lost and/or corrupted during transmission, the converted string would generate a number different from the predetermined value, and the ECUs 105 can determine that the data 115 are of lower quality.

Figure 3:
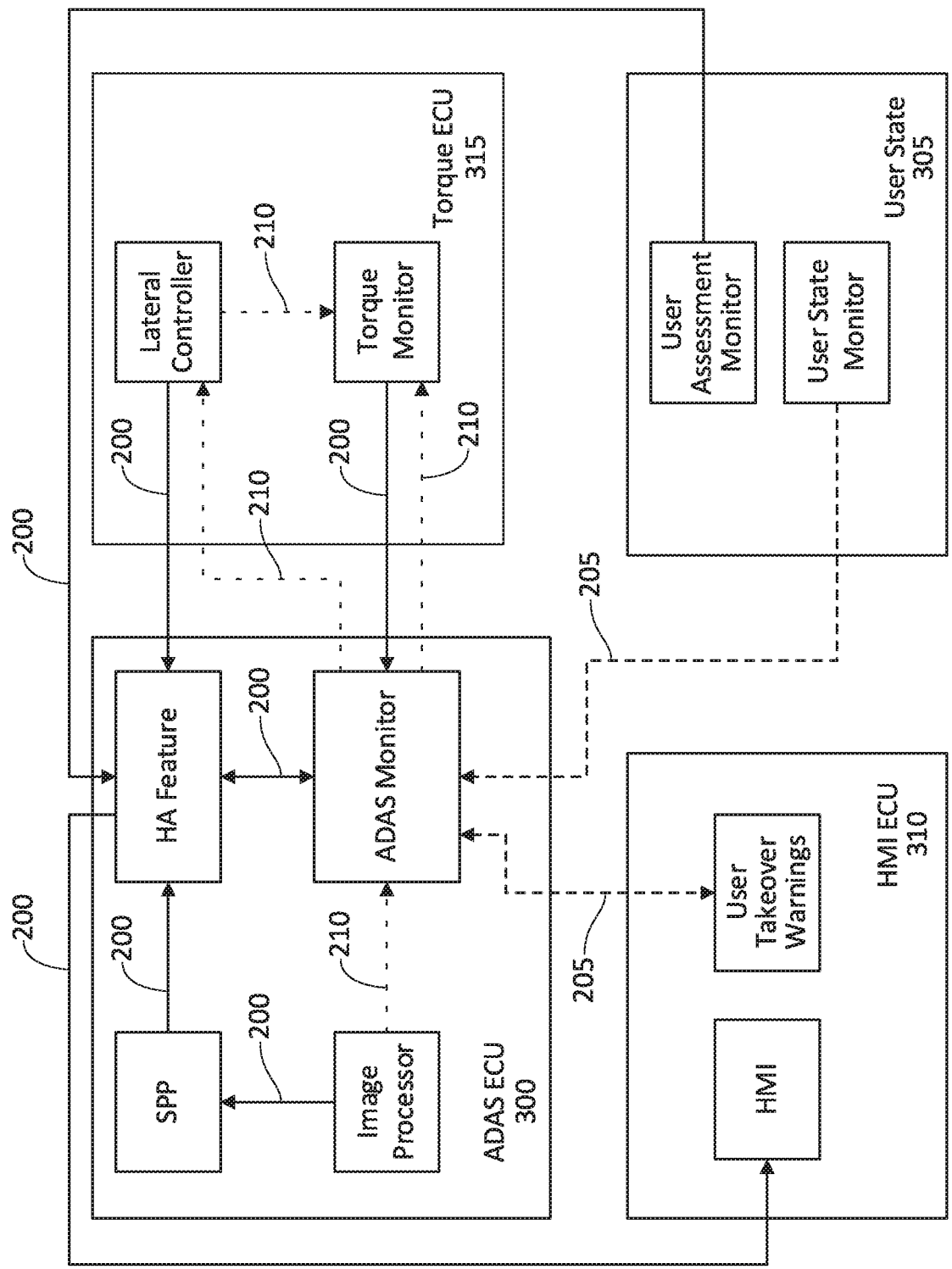
FIG. 3 is a block diagram of a plurality of example ECUs and communication paths.

A first protocol 200, e.g., a conventional Quality Management ("QM") protocol, represented by a solid line in FIG. 2, provides communication between ECUs 105 without a security measure. Communications are sent according to the QM protocol when the risk associated with an event does not require security measures in accordance with ISO 26262. A second protocol 205, e.g., ASIL-A, represented by longer dashed lines in FIG. 2, provides communication with a first security measure. A third protocol 210, e.g., ASIL-B, not shown in FIG. 2 but represented by shorter dashed lines in FIG. 3, provides communication with a second security measure. Automotive Safety Integrity Level (ASIL) is a risk classification scheme defined by the International Organization for Standardization (ISO) standard 26262. The ISO 26262 standard defines four ASIL levels: ASIL-A, ASIL-B, ASIL-C, ASIL-D, where ASIL-A represents the lowest level of risk and ASIL-D represents the highest level of risk. Thus, protocols that correspond to a specific ASIL level provide data redundancy and reliability commensurate with the amount of risk defined by the ASIL level. Hazards for which hardware, functions, and communications lines are designed to prevent have an associated ASIL level. For example, a hazard rated at ASIL-B, e.g., steering out of a roadway lane, has functions, signals, and communication channels compliant with the ASIL-B standard. The ECUs 105 can determine specific protocols 200, 205, 210 for communication between specific ECUs 105 based on, e.g., sensitivity of data 115 transmitted and a requirement of quality for the data 115. For example, the ECUs 105 can transmit data 115 that requires encryption with an ASIL-A protocol 205, and the ECUs 105 can transmit data 115 that does not require encryption with a QM protocol 200.

In the example of FIG. 2, the ECU 105a includes operation programming for one or more components 120, shown as the block labeled "Operation." The ECU 105b includes operation programming labeled "Operation" and monitoring programming, shown as the block labeled "Monitor." The Operation programming typically uses data 115 to operate a plurality of components 120, and data 115 can be transmitted between the ECUs 105a, 105b between the Operation programming according to the first protocol 200, e.g., QM. The Monitor programming includes programming to monitor operation of the component 120 actuated by the ECU 105b and to transmit data 115 to the ECU 105a for use in Operation programming and to the Operation programming of the ECU 105b. Because the Monitor programming focuses specifically on the component 120 associated with the ECU 105b, the Monitor programming can generate more robust data 115 for use by the Operation programming. The ECU 105b can transmit the data 115 from the Monitor programming according to a protocol with a security measure, e.g., ASIL-A 205. By using specific Monitor programming in the ECU 105b, the ECUs 105 can operate the components 120 with greater robustness and safety, ensuring that disruptions to operation missed by the Operation programming are identified by the Monitor programming.

FIG. 3 is a diagram of a plurality of ECUs 105. One of the ECUs 105 can be an Advanced Driver Assistance System (ADAS) ECU 300. The ADAS ECU 300 can be programmed with conventional ADAS operations, including, e.g., detecting whether multiple path polynomials are consistent, determine a consistency of a lane width, determining a driver awareness, etc. The ADAS ECU 300 can actuate components 120 to operate the vehicle 101 in the autonomous and the semiautonomous modes. The ADAS ECU 300 can be included in, e.g., a virtual driver component programmed to operate the vehicle 101 in the autonomous and the semiautonomous modes.

One of the ECUs 105 can be a user state ECU 305. The user state ECU 305 can include programming to actuate one or more sensors 110 to collect data 115 about a user. For example, the user state ECU 305 can actuate a camera to collect image data 115 of the user. Based on the user data 115, the user state ECU 305 can determine one or more states of the user. A "user state" is a condition of the user that can affect manual operation of the vehicle 101 by the user, e.g., awareness, readiness, capability of assuming manual control, wakefulness, drowsiness, distraction, etc. The user state ECU 305 can include programming similar to programming of the ADAS ECU 300, e.g., both the ADAS ECU 300 and the user state ECU 305 can determine a user awareness, as described below. The user state ECU 305 can communicate with, e.g., image sensors 110, steering angle sensors 110, audio sensors 110, etc., to determine the user state.

One of the ECUs 105 can be a human-machine interface (HMI) ECU 310. The HMI ECU 310 can include programming to operate an HMI in the vehicle 101, e.g., a screen, a display, a loudspeaker, etc. The HMI ECU 310 can send instructions to the HMI to, e.g., display a text warning, actuate a flashing light, emit an audio cue, etc. The HMI ECU 310 can communicate with, e.g., the screen, the display, the loudspeaker, etc., to transmit a message and/or a cue to the user.

One of the ECUs 105 can be a steering torque ECU 315. The steering torque ECU 315 actuates a steering component 120 to adjust steering torque of the vehicle 101. The steering torque ECU 315 can receive instructions from the ADAS ECU 300 to operate the steering component 120 to steer the vehicle 101. For example, the ADAS ECU 300 can provide a specified torque to the steering torque ECU 315, and the steering torque ECU 315 can determine the actuation of the steering component 120 (e.g., actuation of a steering assist motor) to generate the specified torque. The steering torque ECU 315 can be included with the steering component 120 and can communicate with, e.g., a steering assist motor. The ADAS ECU 300, the user state ECU 305, the HMI ECU 310, and the steering torque ECU 315 are collectively referred to as "ECUs 105."

The ADAS ECU 300 can include an ADAS monitor. The "ADAS monitor" is programming that the ADAS ECU 300 implements monitor actuation of components 120 as the ADAS ECU 300 operates the vehicle 101 in the autonomous mode. Based on data 115 received by the ADAS ECU 300, the ADAS monitor communicates with one or more of the other ECUs 105 to monitor actuation of components 120. The ADAS monitor can communicate with one or more of the other ECUs 105. For example, the ADAS monitor can receive information from a user state monitor of the user state ECU 305 and can send information to a lateral controller of the torque ECU 315.

The ADAS ECU 300 can include a driver assist feature such as a highway assist (HA) feature. The HA feature actuates components 120 to operate the vehicle 101 without input from the user. The HA feature receives data 115 from the ECUs 305, 310, 315 to operate the components 120. For example, the HA feature can determine a path along which the vehicle 101 travels and can actuate components 120 to move the vehicle 101 along the path. The driver assist feature can be programmed, e.g., according to a Society of Automotive Engineers (SAE) level 2 driver assist protocol. When the driver assist feature is active, the ADAS monitor can actuate components 120 according to the measures recommended by the driver assist feature. The driver assist feature, shown in FIG. 3 as an HA feature, can communicate with the ADAS monitor according to the first protocol 200, e.g., QM.

The ADAS ECU 300 can be programmed to suppress the driver assist feature based on the operating conditions. For example, if the user awareness is below an awareness threshold, the ADAS ECU 300 can suppress the driver assist feature as the HMI ECU 310 actuates the HMI to generate an alert to cause the user to assume manual control of the vehicle 101. By suppressing the driver assist feature, the ADAS ECU 300 prevents interference of control of the vehicle 101 from the driver assist feature, returning manual control of the vehicle 101 to the user.

The ADAS ECU 300 can include an image processor. The image processor is programming that the ADAS ECU 300 implements to process image data 115 from one or more image sensors 110. For example, the image processor can process the image data 115 to identify one or more objects. The image processor can communicate with the ADAS monitor according to the third protocol 210, e.g., ASIL-B.

The ADAS ECU 300 can include a steerable path polynomial (SPP) feature. The SPP feature determines a predicted path of the vehicle 101 based on path polynomials, as described below. The SPP feature can receive data 115 from the image processor according to the QM protocol 200. The SPP feature can send data 115 to the HA feature according to the QM protocol 200.

The user state ECU 305 can include a user state monitor. The user state monitor is programming that determines a user state from data 115 collected by one or more sensors 110 and compares the user state determined by the user state ECU 305 to a user state determined by the ADAS ECU 300. The user state monitor can use image data 115 of the user to determine the user state. A "user state" is a condition of the user that can affect manual operation of the vehicle 101 by the user, e.g., awareness, readiness to assume manual control of the vehicle 101, capability of assuming manual control of the vehicle 101, wakefulness, distraction, etc. For example, the user state ECU 305 can collect data 115 about movement of a user's head to determine whether the user is drowsy and thus unaware and incapable of assuming manual control of the vehicle 101. In another example, the user state ECU 305 can determine, based on a position of the user's head, that the user is looking away from the windshield and is not looking at the roadway, thus not ready to assume manual control of the vehicle 101. The user state monitor can communicate with the ADAS monitor using a protocol with a security measure, e.g., the second protocol 205 ASIL-A, the third protocol 210 ASIL-B, etc.

The user state ECU 305 can include a user assessment monitor. The user assessment monitor is programming collects data 115 indicating whether the user is engaged and ready to assume manual control of the vehicle 10 land sends the data 115 to the HA feature of the ADAS ECU 300. Based on the data 115 from the user assessment monitor, the HA feature can determine a user state and whether the user is ready to assume manual control of the vehicle 101 and can instruct the HMI ECU 310 to display an alert based on the user state. The user assessment monitor can communicate with the HA feature using a protocol lacking a security measure, e.g., the first protocol 200, QM.

The HMI ECU 310 can include an HMI. The HMI can be, e.g., a touchscreen display, a loudspeaker, an indicator light, a dashboard, etc. The HMI ECU 310 can actuate the HMI to communicate with the user. The HMI ECU 310 can, e.g., display text on a touchscreen display, play an audio message over a loudspeaker, flash an indicator light on a dashboard, etc. The HMI can communicate with the HA feature according to the first protocol 200, QM.

The HMI ECU 310 can include a user takeover warning feature. A "user takeover warning feature" is programming to provide an indication from the HMI for the user to assume control of the vehicle 101 as the ADAS ECU 300 transitions the vehicle 101 to the manual mode. The indication can be, e.g., a text message on a touchscreen display, an audio message over a loudspeaker, an indicator light on a dashboard, etc. The ADAS monitor of the ADAS ECU 300 can communicate with the user takeover warning feature to provide the indication to the HMI. The user takeover warning feature can communicate with the ADAS monitor according to the second protocol 205, ASIL-A.

The torque ECU 315 can include a lateral controller feature. The lateral controller feature is programming that the torque ECU 315 implements to determine a specified steering torque to maintain the vehicle 101 on a specified path. For example, the lateral controller feature can receive a steerable path, as described below, from the ADAS ECU 300 and output a specified torque that the torque ECU 315 can process and send to the ADAS ECU 300. The lateral controller feature can send data 115 to the torque monitor according to the third protocol 210, ASIL-B. The lateral controller can receive data 115 from the ADAS monitor according to the third protocol 210, ASIL-B. The lateral controller can send data 115 to the HA feature according to the first protocol 200, QM.

The torque ECU 315 can include a torque monitor feature. The torque monitor feature is programming that the torque ECU 315 implements to ensure that the torque provided by the lateral controller feature to the ADAS ECU 300 is accurate. For example, the torque monitor feature can receive a predicted path along which the vehicle 101 should follow and the determine a specified torque to actuate the steering component 120 to follow the predicted path. The torque monitor feature ensures that the torque requested by the ADAS ECU 200 is accurate to the torque required for operation of the vehicle 101. The torque monitor feature can transmit data 115 to the ADAS monitor according to the first protocol 200, QM. The torque monitor feature can receive data 115 from the ADAS monitor according to the third protocol 210, ASIL-B.

The torque ECU 315 can determine a ramp-out torque for the vehicle 101. The "ramp-out" torque is a prescribed change of torque to which the torque ECU 315 actuate the steering component 120 to reduce control of the steering component 120 by the torque ECU 315 until the user assumes manual control of the vehicle 101. That is, the ramp-out torque reduces the torque applied to the steering component 120 by the torque ECU 315 over a specified period of time, allowing the user to provide torque via, e.g., a steering wheel. For example, the torque ECU 315 can reduce the torque linearly by 15 N-m/s until the torque provided by the torque ECU 315 is zero. The ramp-out torque can be determined based on, e.g., empirical testing of an average time for the user to assume manual control of the vehicle 101 and an amount of torque that the torque ECU 315 can reduce based on the average time.

Each one of the ECUs 105 can collect and process data 115 about an operating condition. As used herein, an "operating condition" is a state that affects operation of the vehicle 101 such that the ECUs 105 actuate components 120 in response to the affected operation of the vehicle 101. Based on the operating condition, one or more of the ECUs 105 can actuate one or more components 120. Each of the ECUs 105 are programmed to monitor a first operating condition and a second operating condition. Each operating condition includes one of path deviation, lane width, user awareness, or steering torque. The ECUs 105 are each further programmed to respectively control vehicle operation based on the first or second operating condition. For example, the vehicle operation can be one of controlling vehicle steering, transitioning from an autonomous mode to one of a semi-autonomous or a manual mode, or controlling a vehicle human machine interface The operating condition can be a path deviation of the vehicle 101. As used herein, a "path deviation" is a difference between a predicted steerable path of the vehicle 101 and a predicted lane path. The "steerable path" is the path along which the ADAS ECU 300 actuates components 120 to move the vehicle 101. The "lane path" is a path along a center line of a roadway lane. As the path deviation increases, the vehicle 101 may move toward boundaries of a roadway lane, potentially leaving the roadway lane and moving toward obstacles or objects in an adjacent lane. The ADAS ECU 300 and the steering torque ECU 315 can determine as an operating condition a path deviation for the vehicle 101. For example, the ADAS ECU 300 can determine the steerable path based on a steerable path polynomial (SPP) and the lane path based on a lane prediction polynomial (LPP). The SPP and LPP can each be determined by a path polynomial y(x) that predicts the steerable path and the lane path for a predetermined upcoming distance x, measured in meters:

$$y(x)=a_0+a_1x+a_2x^2+a_3x^3 \qquad (1)$$

where $a_0$ an offset, i.e., a lateral distance between the respective path and a center line of the vehicle 101 at the upcoming distance x, $a_1$ is a heading angle of the respective path, $a_2$ is the curvature of the respective path, and $a_3$ is the curvature rate of the respective path. For example, techniques for calculating the coefficients $a_0$, $a_1$, $a_2$, $a_3$ can be found in, e.g., U.S. patent application Ser. No. 15/783,900, titled "IN-VEHICLE TRAFFIC ASSIST", filed on Oct. 13, 2017; Ser. No. 15/873,997, titled "LANE CENTERING DISURBANCE MITIGATION," filed on Jan. 18, 2018; Ser. No. 16/085,495, titled "VEHICLE LATERAL MOTION CONTROL," filed Aug. 8, 2018; and Ser. No. 16/217,227, titled "VEHICLE PATH PROCESSING", filed on Dec. 12, 2018; each of which is hereby incorporated by reference in its entirety. In the present context, the "upcoming distance" x is a predetermined longitudinal distance in front of the vehicle 101 from a front bumper of the vehicle 101 at which the sensors 110 collect data 115 and the ADAS ECU 300 predicts the respective path. The upcoming distance x can be determined based on, e.g., a current speed of the vehicle 101, a predetermined time threshold, determined based on empirical simulation data, a detection range of the sensors 110, etc. The time threshold can be, e.g., 1 second.

The ADAS ECU 300 can determine the offset of the path polynomial y(x), which is the coefficient $a_0$. The ADAS ECU 300 can determine a center line of the vehicle 101 along the respective path at the upcoming distance x. The ADAS ECU 300 can determine the offset based on the lateral distance, i.e., the distance perpendicular to the forward longitudinal direction of the vehicle 101, between the center line of the vehicle 101 along the path at the upcoming distance x.

The ADAS ECU 300 can determine the heading angle of the path polynomial y(x), which is the coefficient $a_1$. The heading angle is a predicted angle defined between the center line of the vehicle 101 and the travel path at the upcoming distance x measured in radians with a heading of zero radians equal to a straight direction, i.e., movement of the vehicle 101 when a steering wheel is in a neutral position.

The ADAS ECU 300 can determine the curvature of the path polynomial y(x), which is the coefficient $a_2$. The curvature measures deviation of the path polynomial y(x) from a straight line measured in inverse meters $m^{-1}$. The travel path between the vehicle 101 and the upcoming distance x defines a circular arc, and the ADAS ECU 300 can define a circle based on the arc. A radius of the circle defined by the arc is the curvature of the path polynomial y(x) over the distance x. The ECUs 105 can determine the curvature at the upcoming distance x based on, e.g., conventional curve approximation techniques.

The ADAS ECU 300 can determine a curvature rate of the path polynomial y(x), which is the coefficient $a_3$. The curvature rate is a rate of change of the curvature, as described above, and is measured in inverse square meters $m^{-2}$. The ADAS ECU 300 can determine the curvature rate based on data 115 collected by the sensors 110. For example, the ADAS ECU 300 can determine the curvature of the travel path for the upcoming distance x and for a set of distances [x−Δx, x+Δx] that are Δx around the distance x, and the ADAS ECU 300 can use numerical differentiation methods (e.g., Newton's difference quotient) to determine the curvature rate.

The ADAS ECU 300 can identify a path deviation between the predicted steerable path and the predicted lane path. The ADAS ECU 300 can identify the path deviation as, e.g., the difference between the steerable path determined by the path polynomial $y_{path}$ and the lane path determined by the path polynomial $y_{lane}$:

$$\text{deviation} = |y_{path} - y_{lane}| \quad (2)$$

where the vertical bars specify an absolute value, resulting in a positive value for the path deviation. When the path deviation exceeds a predetermined threshold, the vehicle 101 can exit a current roadway lane. The threshold can be determined based on, e.g., an average distance between an outermost portion of a vehicle 101 and a lane edge marking when the vehicle 101 is moving along the lane path. The average distance between the outermost portion of the vehicle 101 and the lane edge marking can be measured based on image data 115 from one or more sensors 110 in the vehicle 101 detecting the lane edge marking. That is, the ADAS ECU 300 can determine the position of the lane edge marking in a vehicle coordinate system and the outermost portion of the vehicle 101 can be a predefined value stored in the data store 106 based on known dimensions of the vehicle 101. In another example, the server 130 can determine the average distance based on geocoordinate data 115 of the vehicle 101, dimensions of the vehicle 101, and geocoordinate data of the lane edge marking.

The SPP feature and the LPP feature can use different protocols 200, 205, 210 from one another to collect data 115. According to SPP, the ADAS ECU 300 collects data 115 according to a protocol without a security measure, e.g., end-to-end protection, ISO 26262, etc., such as a Quality Management ("QM") protocol 200. The LPP feature collects data 115 according to a protocol with a security measure, e.g., an ASIL-B protected signal with a checksum and/or counter for robustness and security in accordance with ISO 26262, an ASIL-A protected signal, etc. Thus, with the security measure, the LPP feature can identify deviations of the vehicle 101 from the travel path that the SPP feature may not identify with regard to the steerable path. The LPP feature can predict the lane path based on image data 115 of the roadway lane, e.g., images of a lane edge marking, a lane barrier, an edge of a roadway, etc.

The torque ECU 315 can determine a steering torque and a path torque. The "steering torque" is the torque requested by the ADAS ECU 300 to the lateral controller feature of the torque ECU 315 to steer the vehicle 101 according to the steerable path. The "path torque" is the specified torque required based on the coefficients of lane path to steer the vehicle 101 according to the lane path. The torque ECU 315 can determine the steering torque and the path torque according to, e.g., techniques described in U.S. patent application Ser. No. 16/085,495, titled "VEHICLE LATERAL MOTION CONTROL," filed Aug. 8, 2018, incorporated herein by reference in its entirety. The steering torque and the path torque are typically defined in units of Newton-meters (N-m). The torque ECU 315 can determine a difference between the steering torque and the path torque. When the difference exceeds a threshold, the torque ECU 315 determines that the lateral controller output is inconsistent with the lane path, i.e., the torque output from the lateral controller output would steer the vehicle 101 away from the lane path. The threshold can be determined as the minimum torque required to steer the vehicle 101 from the steerable path to the lane path and can be determined based on simulation testing of a vehicle 101 following a simulated steerable path and a simulated lane path and measuring torques requested by a simulated ADAS ECU 300 and a simulated torque ECU 315. Upon determining that the lateral controller output is inconsistent with the lane path, the torque ECU 315 can instruct the ADAS ECU 300 to suppress the HA feature and the torque ECU 315 can ramp-out the steering torque.

The operating condition can be a lane width of a roadway lane. In present examples, a "lane width" is a shortest distance between lane edge markings of the roadway lane. As the vehicle 101 travels along the roadway lane, the lane width may decrease, indicating that the current roadway lane will merge with an adjacent roadway lane, and the vehicle 101 must move to the adjacent roadway lane. Alternatively, the lane width may decrease to a shorter lane width, decreasing the space between the vehicle 101 and the lane edge markings and requiring finer steering torque adjustments to maintain the vehicle 101 in the roadway lane. The ADAS ECU 300 and the steering torque ECU 315 can determine the operating condition of a lane width for a roadway lane.

The ADAS ECU 300 can determine the lane width of the roadway lane. The ADAS ECU 300 can collect data 115 regarding lane edge markings and determine the lane width of the roadway lane at a specified distance in front of the vehicle 101. The ADAS ECU 300 can compare the lane width to a width threshold. The width threshold can be, e.g., a width of the vehicle 101. That is, the width threshold can be determined to ensure that the lane width is greater than the width of the vehicle 101, and that the vehicle 101 does not move into an adjacent lane. If the lane width is below the width threshold, the ADAS ECU 300 can suppress (i.e., render inactive or non-functional) the HA feature.

Upon determining that the lane width is below the width threshold, the ADAS ECU 300 can initiate a timer and determine whether the lane width is below the width threshold for an elapsed time exceeding a time threshold. The time threshold can be, e.g., a time resolution of determinations of the lane width by the ADAS ECU 300. If the elapsed time is below the time threshold, the ADAS ECU 300 can determine that the roadway lane will not end and the determination of the lane width below the width threshold may have been an error in the collected data 115. If the elapsed time is above the time threshold, the ADAS ECU 300 can determine that the roadway lane will end and can suppress the HA feature.

The torque ECU 315 can ramp-out the torque when the lane width is below the width threshold. If the lane width is below the width threshold, the torque ECU 315 can determine that the roadway lane is about to end and can determine to return control of the steering component 120 to the user. As described above the torque ECU 315 can reduce the torque to allow the user to assume manual control. The torque ECU 315 can determine to ramp-out the torque when the elapsed time is above the time threshold.

The operating condition can be a user awareness. As used herein, a "user awareness" is a measure of a user's capability to assume manual control of the vehicle 101 and readiness to act to assume manual control based on the user state. For example, if the user is asleep, the ADAS ECU 300 can determine that the user has no capability to assume manual control and is not ready to assume manual control. In another example, if the user is awake with hands on a steering wheel, the ADAS monitor of the ADAS ECU 300, as described above, can determine that the user is capable of assuming manual control and ready to assume manual control. The ADAS ECU 300, the user state ECU 305, and the HMI ECU 310 can determine the operating condition of user awareness. As described above, the ADAS ECU 300 and the user state ECU 305 can each determine a user state. The ADAS ECU 300 and/or the user state ECU 305 can include determine the user state and the user awareness based on conventional user state techniques.

The ADAS ECU 300 can determine a user awareness. The ADAS ECU 300 can determine the user awareness based the user state determined by the user state monitor, as described above, according to the second protocol 205, ASIL-A. By determining the user state with the user state ECU 305 and the user awareness with the ADAS ECU 300, the ECUs 300, 305 can provide additional determinations about whether the user is able and ready to assume manual control.

The ADAS ECU 300 can compare the user awareness to an awareness threshold. The awareness threshold can be determined based on, e.g., empirical testing of a user ability to assume control of the vehicle 101 at different specified values of user awareness. That is, the awareness threshold can be determined such that the user would not be ready to assume manual control of the vehicle 101 when one of the ECUs 105 determines to return manual control to the user. The empirical testing can be selected according to a safety protocol, e.g., ASIL-A, ASIL-B, etc.

Upon determining that the user awareness is below the awareness threshold, the ADAS ECU 300 can initiate a timer and determine an elapsed time since the user awareness fell below a user time threshold. The user time threshold can be, e.g., a time required to ramp-out torque and return manual control to the user. That is, the user time threshold can be determined such that, if the elapsed time exceeds the user time threshold, the ADAS ECU 300 will have returned manual control to the user but the user cannot assume the manual control. If the elapsed time exceeds the user time threshold, the ADAS ECU 300 can instruct the HMI ECU 310 to actuate an alert. The alert can be, e.g., a visual alert on an HMI, an audial alert through a loudspeaker, a haptic alert through a steering wheel, etc. The alert can include a message indicating that the user should assume manual control of the vehicle 101 as the ADAS ECU 300 transitions into the manual mode.

The operating condition can be a steering torque of a steering component 120. The steering torque is a specified torque output from the steering component 120, e.g., to reduce torque output from the torque ECU 315 as the ADAS ECU 300 returns control of the vehicle 101 to the user in the manual mode. The torque ECU 315 can actuate the steering component 120 based on the steering torque provided by the ADAS ECU 300.

The torque ECU 315 can identify a steering fault. As used herein, a "steering fault" is a determination that the steering component 120 cannot provide the required steering torque for a specified path for the vehicle 101 to follow. The torque ECU 315 can identify the steering fault based on a steerable path, as described above, that the ADAS ECU 300 instructs the torque ECU 315 to follow. If the required steering torque exceeds a maximum possible steering torque by the steering component, the torque ECU 315 can identify the steering fault. In another example, the torque ECU 315 can identify the steering fault upon determining that the torque requested by the ADAS ECU 300 is insufficient for the roadway, e.g., the torque would move the vehicle 101 into an adjacent roadway, the torque would not follow a curved road, etc. Upon identifying the steering fault, the torque ECU 315 can instruct the ADAS ECU 300 to instruct the HMI ECU 310 to provide an alert to the user. Alternatively or additionally, upon identifying the steering fault, the torque ECU 315 can ramp-out the torque and return manual control of the steering component 120 to the user.

Figure 4:
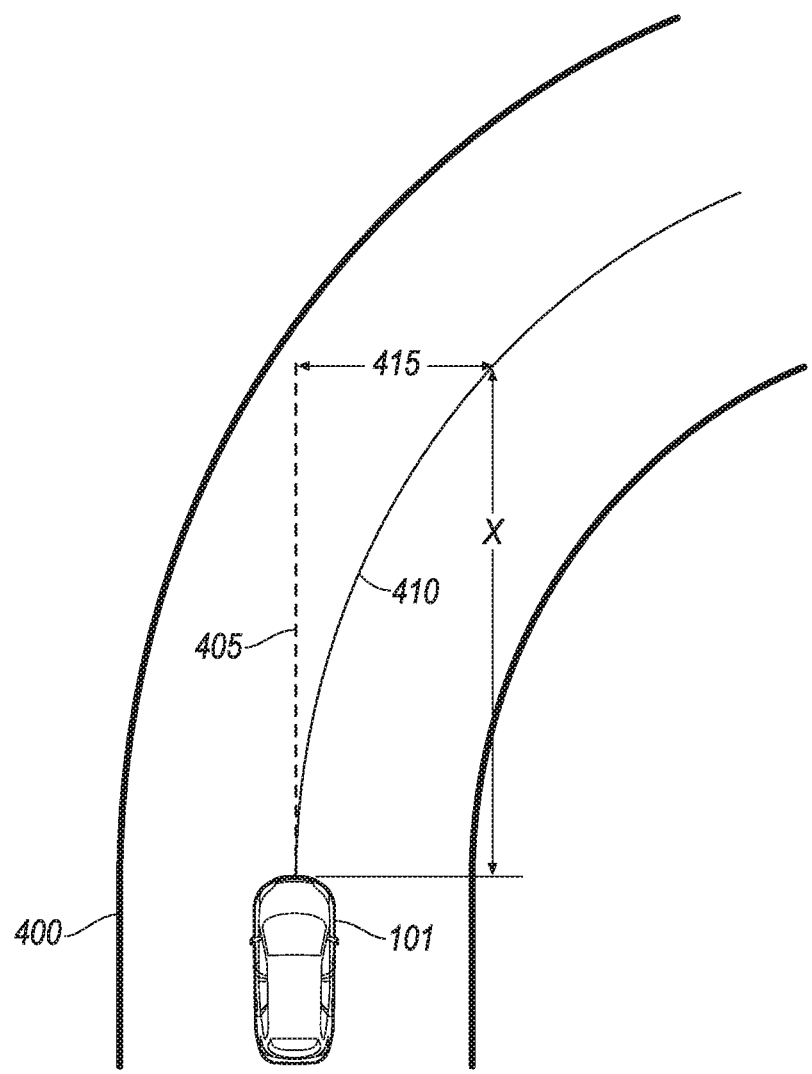
FIG. 4 is a plan view of an example operating condition of the vehicle.

FIG. 4 illustrates an operating condition of a path deviation of an example vehicle 101. The vehicle 101 travels in a roadway lane 400. The ADAS ECU 300 can determine a steerable path 405 for the upcoming distance x based on the SPP feature and a lane path 310 for the upcoming distance x based on the LPP feature, as described above. The ADAS ECU 300 can determine a path deviation 415 between the steerable path 405 and the lane path 310. When the path deviation 315 exceeds a predetermined threshold, as described above, the ADAS ECU 300 can determine to return control of the vehicle 101 to the user in the manual or semiautonomous mode.

The torque ECU 315 can determine a required torque for the steering component 120 based on the steerable path 405 and the lane path 410. When the steerable path 405 is along the lane path 415 (i.e., the path deviation 415 is below the threshold), the required torque to follow the steerable path 405 is substantially the torque required to follow the lane path 410. That is, the torque ECU 315 can determine a difference between the required torque to follow the steerable path 405 and the required torque to follow the lane path 410. If the difference exceeds a torque threshold, then the torque ECU 315 determines that the steerable path 405 deviates from the lane path 410, and the torque ECU 315 can determine a ramp-out torque to return control of the vehicle 101 to the user.

Figure 5:
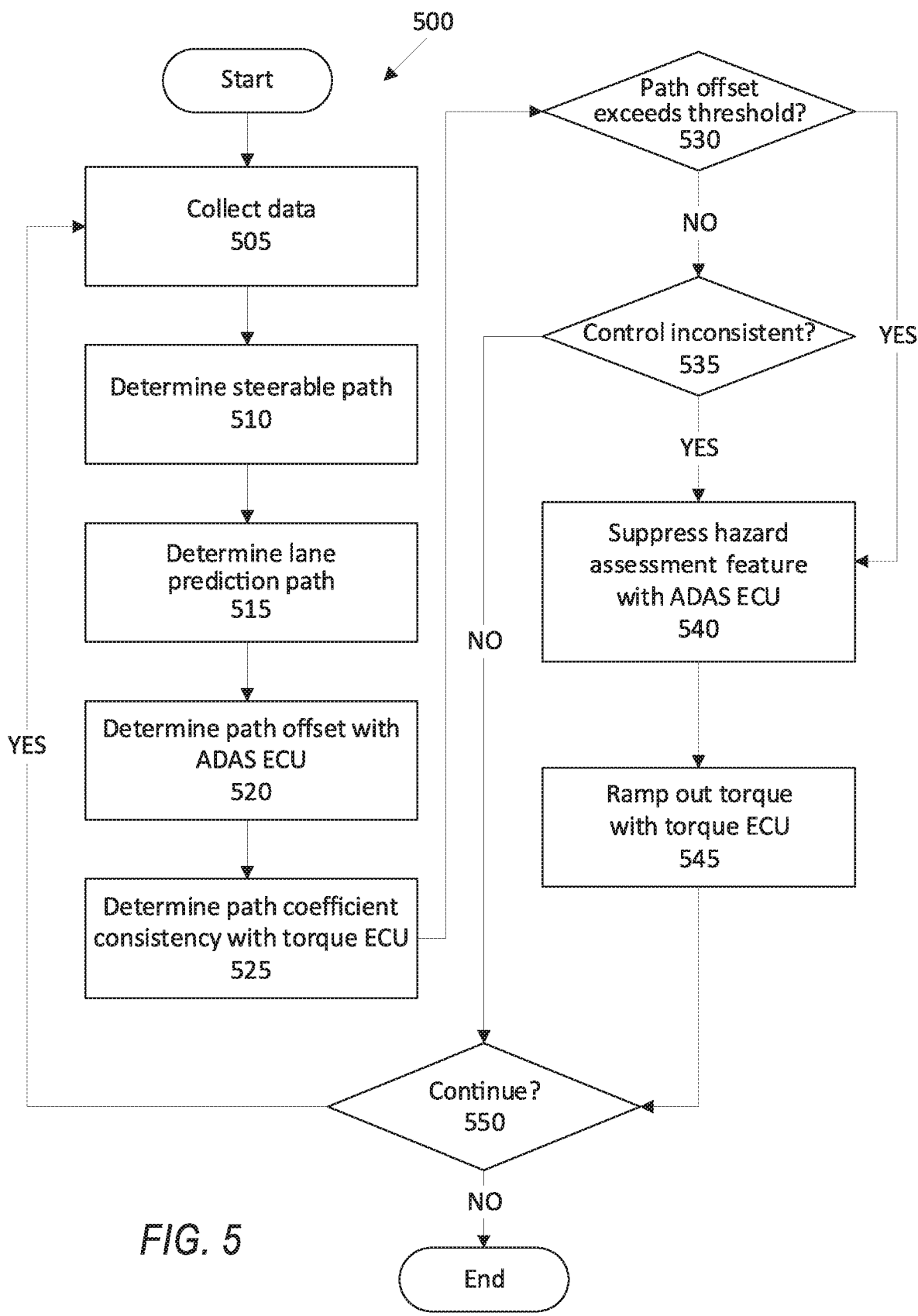
FIG. 5 is a diagram of an example process for determining a path deviation.

FIG. 5 is a block diagram of an example process 500 for determining a path deviation. The process 500 being in a block 505, in which the ADAS ECU 300 collects data 115 about the environment surrounding the vehicle 101. The ADAS ECU 300 can actuate one or more sensors 110 to collect data 115 of, e.g., speed, acceleration, curvature, curvature rate, lane markings, etc.

Next, in a block 510, the ADAS ECU 300 determines a steerable path. As described above, the steerable path is the path along which the ADAS ECU 300 actuates components 120 to move the vehicle 101. The ADAS ECU 300 can determine the steerable path based on, e.g., a steerable path polynomial (SPP) feature, as described above, that is based on a vehicle 101 speed and/or acceleration.

Next, in a block 515, the ADAS ECU 300 determines a lane path. As described above, the lane path is a path along a center line of a roadway lane. The ADAS ECU 300 can determine the lane path based on, e.g., a lane prediction polynomial (LPP) feature, as described above, that is based on image data 115 of lane markings.

Next, in a block 520, the ADAS ECU 300 determine a path deviation. As described above, the path deviation is the lateral distance between the steerable path and the lane path. As the path deviation increases, the steerable path can lead the vehicle 101 to deviate from the roadway lane, and the vehicle 101 may leave the current roadway lane.

Next, in a block 525, the torque ECU 315 determines a steering torque to operate the vehicle 101 to follow the steerable path and a lane torque to operate the vehicle 101 to follow the lane path. The torque ECU 315 can determine the steering torque based on, e.g., the coefficients of the SPP indicating the offset, heading angle, curvature, and curvature rate. The torque ECU 315 can determine the lane torque based on, e.g., the coefficients of the LPP indicating the offset, heading angle, curvature, and curvature rate.

Next, in a block 530, the ADAS ECU 300 determines whether the path deviation exceeds a threshold. As described above, the threshold can be determined based on, e.g., an average distance between an outermost portion of a vehicle 101 and a lane edge marking when the vehicle 101 is moving along the lane path. If the path deviation exceeds the threshold, the process 500 continues in a block 540. Otherwise, the process 500 continues in a block 535.

In the block 535, the torque ECU 315 determines whether a difference between the steering torque and the path torque exceeds a threshold. As described above, the threshold can be determined as the minimum torque required to steer the vehicle 101 from the steerable path to the lane path and can be determined based on simulation testing of a vehicle 101 following a simulated steerable path and a simulated lane path and measuring torques requested by a simulated ADAS ECU 300 and a simulated torque ECU 315. If the difference exceeds the threshold, the torque ECU 315 determines that the lateral controller output is inconsistent with the lane path and the process 500 continues in a block 540. Otherwise, the process 500 continues in a block 550.

In the block 540, the ADAS ECU 300 suppresses, i.e., disables, a highway assist (HA) feature. As described above, suppressing the HA feature prevents intervention of the ADAS ECU 300 with operation of the vehicle 101 by the user in the manual mode.

Next, in a block 545, the torque ECU 315 determines a ramp-out torque to return control of the vehicle 101 to the user. As described above, the ramp-out torque is a prescribed change of torque to which the torque ECU 315 actuates the steering component 120 to reduce control of the steering component 120 by the torque ECU 315 until the user assumes manual control of the vehicle 101.

In the block 550, the ADAS ECU 300 determines whether to continue the process 500. For example, the ADAS ECU 300 can determine not to continue the process 400 if the ADAS ECU 300 has returned manual control of the vehicle 101 to the user. If the ADAS ECU 300 determines to continue, the process 500 returns to the block 505 to collect more data 115. Otherwise, the process 500 ends.

Figure 6:
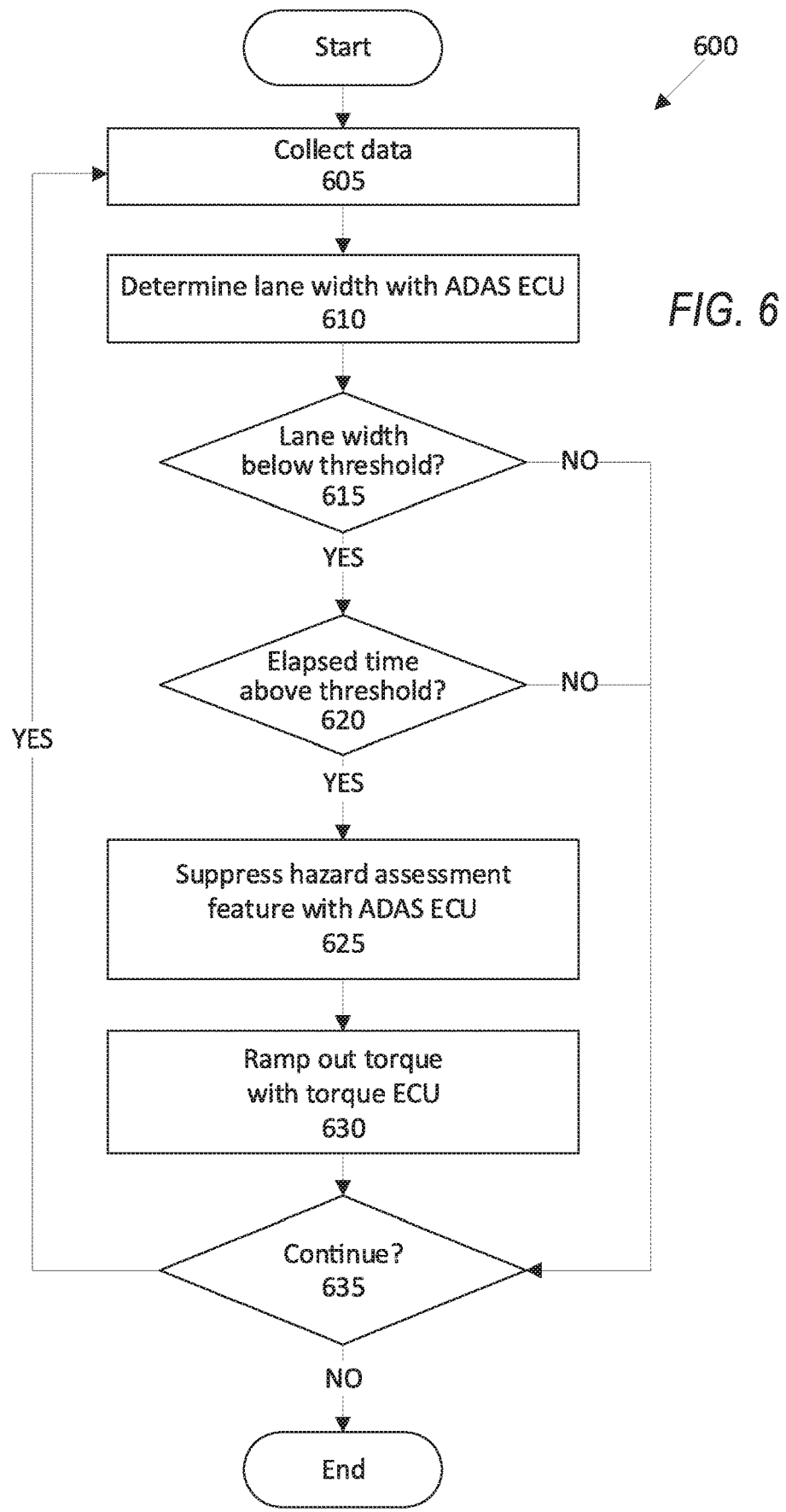
FIG. 6 is a diagram of an example process for determining a lane width of a roadway lane.

FIG. 6 is a block diagram of an example process 600 for determining a lane width of a roadway lane. The process 600 begins in a block 605, in which the ADAS ECU 300 actuates one or more sensors 110 to collect data 115. The ADAS ECU 300 can collect data 115 of, e.g., lane markings, lane boundaries, etc.

Next, in a block 610, the ADAS ECU 300 determines an upcoming lane width, e.g., in meters or fractions thereof. As described above, the ADAS ECU 300 can determine the lane width for an upcoming distance of the roadway lane. The ADAS ECU 300 can collect data 115 from one or more sensors 110 of, e.g., lane markings, lane boundaries, etc., and can determine the upcoming lane width at a specified distance in front of the vehicle 101.

Next, in a block 615, the ADAS ECU 300 determines whether the lane width is below a threshold. As described above, when the lane width is below the threshold, the ADAS ECU 300 can determine that the roadway lane is about to merge with an adjacent roadway lane and the vehicle 101 must exit the current roadway lane. If the lane width is below the threshold, the process 600 continues in a block 620. Otherwise, the process 600 continues in a block 635.

In the block 620, the ADAS ECU 300 determines whether an elapsed time that the lane width has been below the threshold exceeds a time threshold. The time threshold can be, e.g., a time resolution of determinations of the lane width by the ADAS ECU 300. Upon first determining that the lane width is below the threshold, the ADAS ECU 300 can initiate a timer to measure the elapsed time that the lane width remains below the threshold. If the elapsed time exceeds the time threshold, the process 600 continues in a block 625. Otherwise, the process 600 continues in a block 635.

In the block 625, the ADAS ECU 300 suppresses the HA feature. As described above, suppressing the HA feature prevents intervention of the ADAS ECU 300 with operation of the vehicle 101 by the user in the manual mode.

Next, in a block 630, the torque ECU 315 determines the ramp-out torque to return control of the vehicle 101 to the user. As described above, the ramp-out torque is a prescribed change of torque to which the torque ECU 315 actuate the steering component 120 to reduce control of the steering component 120 by the torque ECU 315 until the user assumes manual control of the vehicle 101.

In the block 635, the ADAS ECU 300 determines whether to continue the process 600. For example, the ADAS ECU 300 can determine not to continue the process 600 when the ADAS ECU 300 returns manual control of the vehicle 101 to the user. If the ADAS ECU 300 determines to continue, the process 600 returns to the block 605 to collect more data 115. Otherwise, the process 600 ends.

Figure 7:
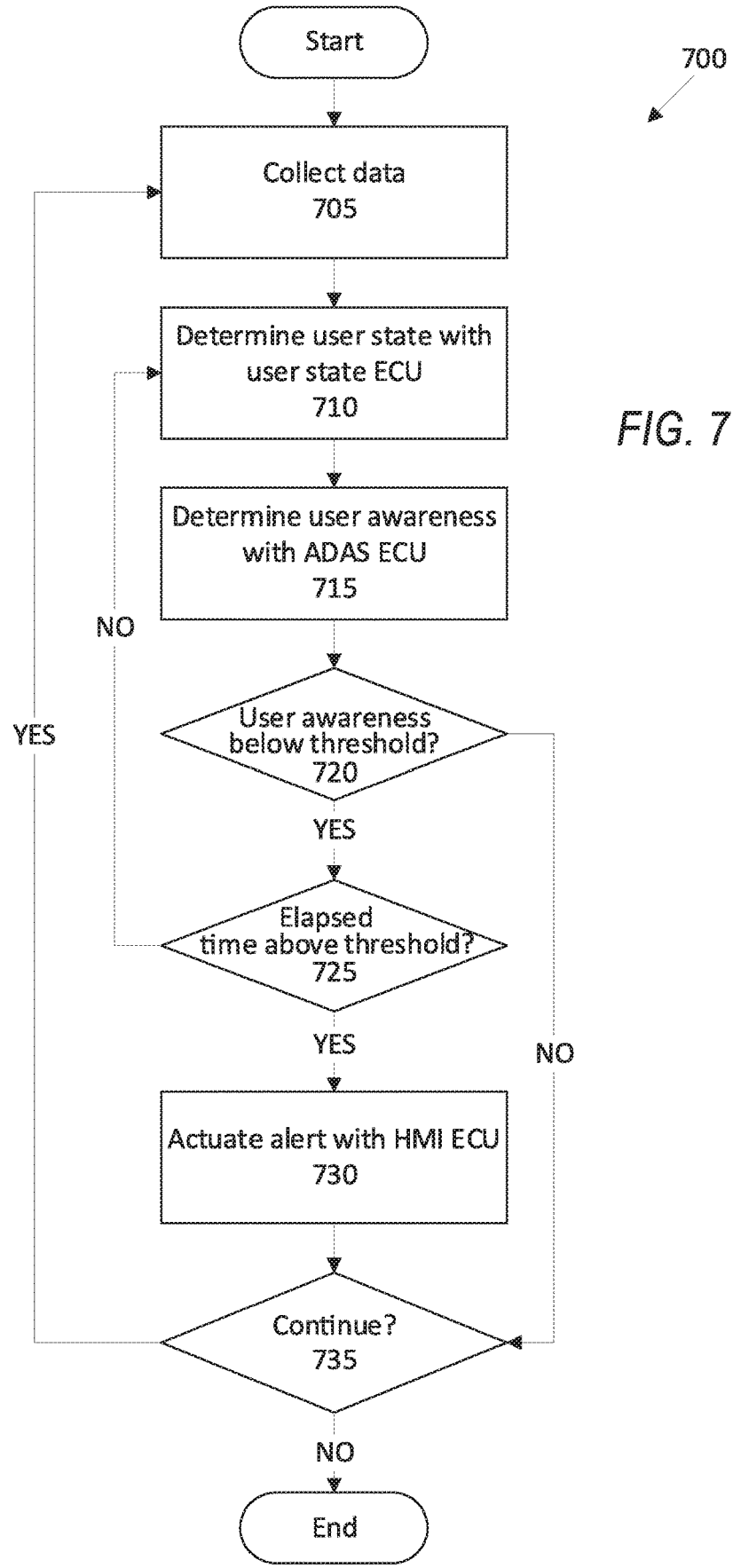
FIG. 7 is a diagram of an example process for determining a user awareness.

FIG. 7 is a block diagram of an example process 700 for determining a user awareness. The process 700 begins in a block 705, in which the ADAS ECU 300 and the user state ECU 305 each collect data 115 about the user.

Next, in a block 710, the user state ECU 305 determines a user state. As described above, the user state is a condition of the user that can affect manual operation of the vehicle 101 by the user, e.g., awareness, readiness, capability of assuming manual control, wakefulness, distraction, etc. For example, the user state can be determined based on motion of a user's head.

Next, in a block 715, the ADAS ECU 300 determines a user awareness. Based on the user state as determined by the user state ECU 305, the ADAS ECU 300 determines the user awareness, which is a measure of a user's capability to assume manual control of the vehicle 101 and readiness to act to assume manual control based on the user state.

Next, in a block 720, the ADAS ECU 300 determines whether the user awareness is below a threshold. The awareness threshold can be determined based on, e.g., empirical testing of user ability to assume control of the vehicle 101 at different specified values of user awareness. That is, the awareness threshold can be determined such that the user would not be ready to assume manual control of the vehicle 101 when the ADAS ECU 300 determines to return manual control to the user. If the user awareness is below the threshold, the user may not be able to assume manual control of the vehicle 101 when the ADAS ECU 300 determines to transition into the manual mode. If the user awareness is below the threshold, the process 700 continues in a block 725. Otherwise, the process 700 continues in a block 735.

In the block 725, the ADAS ECU 300 determines if the user awareness has been below the threshold for an elapsed time exceeding a predetermined user time threshold. The user time threshold can be, e.g., a time required to ramp-out torque and return manual control to the user. That is, brief lapses in user awareness may not warrant alerts to the user, so the ADAS ECU 300 can determine the elapsed time since the user awareness fell below the threshold. If the user awareness has been below the threshold for the elapsed time exceeding the user time threshold, the process 700 continues in a block 730. Otherwise, the process 700 returns to the block 710 to determine the user state and whether the user awareness continues to stay below the threshold.

In the block 730, the HMI ECU 310 actuates an alert. As described above, the alert can be, e.g., a visual alert on an HMI, an audial alert through a loudspeaker, a haptic alert through a steering wheel, etc. The alert can include a message indicating that the user should assume manual control of the vehicle 101 as the ADAS ECU 300 transitions into the manual mode.

In the block 735, the ADAS ECU 300 determines whether to continue the process 700. For example, the ADAS ECU 300 can determine not to continue the process 700 when the ADAS ECU 300 returns manual control of the vehicle 101 to the user. If the ADAS ECU 300 determines to continue, the process 700 returns to the block 705 to collect more data 115. Otherwise, the process 700 ends.

The adjectives "first," "second," "third," and "fourth" are used throughout this document are not intended to signify importance or order. For example, in a plurality, the terms "first" and "second" may refer to any two of the plurality. That is, the "first" ECU can be any one of the ADAS ECU 300, the user state ECU 305, the HMI ECU 310, or the steering torque ECU 315, and the "second" ECU can be any other one of the ADAS ECU 300, the user state ECU 305, the HMI ECU 310, or the steering torque ECU 315 that is not already the "first" ECU.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the ECUs 105 and server 130 include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the ECUs 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 500, one or more of the steps could be omitted, or the steps could be executed in a different order than shown in FIG. 5. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising:
    first and second electronic control units (ECUs) in a vehicle programmed to monitor, respectively, a first operating condition and a second operating condition, each operating condition including one of path deviation, lane width, user awareness, or steering torque, the first operating condition being a different operating condition than the second operating condition;
    wherein the second ECU is programmed to monitor the second operating condition according to a protocol with a security measure;
    wherein the first or second ECU is further programmed to control vehicle operation based on the first or second operating condition; and
    wherein the first ECU is programmed to suppress vehicle operation by the first ECU based on output of the second ECU, and the second ECU is programmed to control vehicle operation based on the second operating condition upon suppression of vehicle operation by the first ECU.

2. The system of claim 1, wherein the vehicle operation is one of controlling vehicle steering, transitioning from an autonomous mode to one of a semi-autonomous or a manual mode, or controlling a vehicle human machine interface.

3. The system of claim 1, wherein the first ECU is programmed to monitor the first operating condition according to a protocol with a security measure.

4. The system of claim 1, wherein programming to monitor path deviation includes programming to determine that a deviation between a first projected path of the vehicle and a second projected path of the vehicle exceeds a deviation threshold, and then to suppress a driver assist feature in one or both of the first ECU or the second ECU.

5. The system of claim 4, wherein programming to monitor path deviation includes programming to, upon disabling the driver assist feature in one of the first ECU or the second ECU, control vehicle steering with the other of the first ECU or the second ECU.

6. The system of claim 1, wherein programming to monitor path deviation includes programming to determine a predicted steerable path based on at least one of a vehicle heading angle, a curvature, or a curvature rate.

7. The system of claim 1, wherein programming to monitor path deviation includes programming to determine a predicted lane path based on at least one of a lane marking, a lane barrier, and a roadway edge.

8. The system of claim 1, wherein programming to monitor lane width includes programming to determine that a lane width in front of the vehicle is below a width threshold for an elapsed time exceeding a time threshold, and then to suppress a driver assist feature in one of the first ECU or the second ECU.

9. The system of claim 1, wherein programming to monitor user awareness includes programming to, upon the first ECU determining that a user awareness is below an awareness threshold, actuate a driver alert with the second ECU.

10. The system of claim 9, wherein the programming to monitor user awareness includes programming the first ECU to determine that the user awareness is below the awareness threshold based on a user awareness assessment determined by a third ECU.

11. The system of claim 1, wherein programming to monitor steering torque with the first ECU includes programming to actuate a steering component to a specified steering torque based on a predicted steerable path from the second ECU.

12. The system of claim 1, wherein programming to monitor steering torque includes programming to, based on a predicted steerable path, identify a steering fault.

13. The system of claim 12, wherein the programming to monitor steering torque includes programming to actuate a driver alert upon identifying the steering fault.

14. The system of claim 1, wherein the first ECU is further programmed to communicate with the second ECU according to a first protocol with a first security measure and to communicate with a third ECU according to a second protocol with a second security measure.

15. The system of claim 1, wherein the first or second ECU is further programmed to arbitrate between the first operating condition and the second operating condition and, then, to control vehicle operation based on the arbitrated first or second operating condition.

16. A system, comprising:
    first and second electronic control units (ECUs) in a vehicle programmed to monitor, respectively, a first operating condition and a second operating condition, each operating condition including one of path deviation, lane width, user awareness, or steering torque, the first operating condition being a different operating condition than the second operating condition;
    wherein the second ECU is programmed to monitor the second operating condition according to a protocol with a security measure;
    wherein the first or second ECU is further programmed to control vehicle operation based on the first or second operating condition;
    wherein programming to monitor path deviation includes programming to determine that a deviation between a first projected path of the vehicle and a second projected path of the vehicle exceeds a deviation threshold, and then to suppress a driver assist feature in one or both of the first ECU or the second ECU; and
    programming to monitor path deviation includes programming to, upon disabling the driver assist feature in one of the first ECU or the second ECU, control vehicle steering with the other of the first ECU or the second ECU.

17. A system, comprising:
    first and second electronic control units (ECUs) in a vehicle programmed to monitor, respectively, a first operating condition and a second operating condition, each operating condition including one of path deviation, lane width, user awareness, or steering torque, the first operating condition being a different operating condition than the second operating condition;
    wherein the second ECU is programmed to monitor the second operating condition according to a protocol with a security measure;

wherein the first or second ECU is further programmed to control vehicle operation based on the first or second operating condition; and wherein programming to monitor steering torque with the first ECU includes programming to actuate a steering component to a specified steering torque based on a predicted steerable path from the second ECU.

18. The system of claim 17, wherein programming to monitor path deviation includes programming to determine that a deviation between a first projected path of the vehicle and a second projected path of the vehicle exceeds a deviation threshold, and then to suppress a driver assist feature in one or both of the first ECU or the second ECU.

19. The system of claim 18, wherein programming to monitor path deviation includes programming to, upon disabling the driver assist feature in one of the first ECU or the second ECU, control vehicle steering with the other of the first ECU or the second ECU.

20. A system, comprising:
first and second electronic control units (ECUs) in a vehicle programmed to monitor, respectively, a first operating condition and a second operating condition, each operating condition including one of path deviation, lane width, user awareness, or steering torque, the first operating condition being a different operating condition than the second operating condition;
wherein the second ECU is programmed to monitor the second operating condition according to a protocol with a security measure;
wherein the first or second ECU is further programmed to control vehicle operation based on the first or second operating condition;
wherein the first ECU is further programmed to communicate with the second ECU according to a first protocol with a first security measure and to communicate with a third ECU according to a second protocol with a second security measure.

* * * * *